United States Patent
Martin et al.

(10) Patent No.: US 11,178,005 B2
(45) Date of Patent: Nov. 16, 2021

(54) METHODS, SYSTEMS, AND COMPUTER READABLE MEDIA FOR MANAGING MULTIPLE SOFTWARE DEFINED WIDE AREA NETWORK (SD-WAN) SOFTWARE VERSIONS

(71) Applicant: Oracle International Corporation, Redwood Shores, CA (US)

(72) Inventors: Todd Martin, Campbell, CA (US); Christopher Wayne Parsons, Apex, NC (US); Wei Huang, Cary, NC (US); Cheryl Lynn Adams, Cary, NC (US); Paul D. Worley, Newton Grove, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/002,762

(22) Filed: Aug. 25, 2020

(65) Prior Publication Data

US 2021/0318863 A1 Oct. 14, 2021

Related U.S. Application Data

(60) Provisional application No. 63/009,235, filed on Apr. 13, 2020.

(51) Int. Cl.
*H04L 12/24* (2006.01)
*G06F 8/71* (2018.01)
(Continued)

(52) U.S. Cl.
CPC .......... *H04L 41/0803* (2013.01); *G06F 8/71* (2013.01); *H04L 12/2854* (2013.01);
(Continued)

(58) Field of Classification Search
CPC . H04L 41/0803; H04L 41/0886; H04L 63/20; H04L 63/0428; H04L 12/4641; H04L 12/2854; H04L 69/22
See application file for complete search history.

(56) References Cited

U.S. PATENT DOCUMENTS 5,649,200 A 7/1997 Leblang et al.
5,708,828 A 1/1998 Coleman
(Continued)

OTHER PUBLICATIONS

Commonly-assigned, co-pending U.S. Appl. No. 16/888,641 for "Methods and Apparatus for Providing Adaptive Private Network Database Schema Migration And Management Processes," (Unpublished, filed May 29, 2020).

(Continued)

*Primary Examiner* — Kyung H Shin
(74) *Attorney, Agent, or Firm* — Jenkins, Wilson, Taylor & Hunt, P.A.

(57) ABSTRACT

A method for managing multiple software defined wide area network (SD-WAN) software versions includes providing a controller that defines an overall configuration for an SD-WAN and that creates configuration registries for individual SD-WAN appliances to implement their respective portions of the overall configuration. The controller generates, in an intermediate configuration language registry format, a first and second configuration registry for first and second SD-WAN appliance that respectively execute first and second versions of SD-WAN software. The controller respectively transmits the first and second configuration registries to the first and second SD-WAN appliances, which use the first and second configuration registries to configure themselves. The first and second SD-WAN appliances negotiate with each other for common SD-WAN features usable to implement configurations specified in the first and second configuration registries.

20 Claims, 7 Drawing Sheets

(51) Int. Cl.
*H04L 29/06* (2006.01)
*H04L 12/28* (2006.01)
*H04L 12/46* (2006.01)

(52) U.S. Cl.
CPC ...... *H04L 63/0428* (2013.01); *H04L 12/4641* (2013.01); *H04L 41/0886* (2013.01); *H04L 63/20* (2013.01); *H04L 69/22* (2013.01)

(56) References Cited

U.S. PATENT DOCUMENTS

| | | | |
|---|---|---|---|
| 6,496,867 | B1 | 12/2002 | Beser et al. |
| 8,125,907 | B2 | 2/2012 | Averi et al. |
| 8,274,891 | B2 | 9/2012 | Averi et al. |
| 8,452,846 | B2 | 5/2013 | Fredette et al. |
| 8,644,164 | B2 | 2/2014 | Averi et al. |
| 8,775,547 | B2 | 7/2014 | Fredette et al. |
| 9,813,289 | B2 * | 11/2017 | Kis .................. H04L 69/22 |
| 10,698,923 | B2 | 6/2020 | Martin et al. |
| 2002/0161757 | A1 | 10/2002 | Mock et al. |
| 2009/0310485 | A1 | 12/2009 | Averi et al. |
| 2012/0042032 | A1 | 2/2012 | Fredette et al. |
| 2012/0117273 | A1 | 5/2012 | Averi et al. |
| 2012/0314578 | A1 | 12/2012 | Averi et al. |
| 2013/0238743 | A1 | 9/2013 | Fredette et al. |
| 2014/0173331 | A1 | 6/2014 | Martin et al. |
| 2014/0185445 | A1 | 7/2014 | Averi et al. |
| 2014/0325038 | A1 * | 10/2014 | Kis ................ H04L 41/0803 709/220 |
| 2014/0376379 | A1 | 12/2014 | Fredette et al. |
| 2015/0071067 | A1 | 3/2015 | Martin et al. |
| 2016/0072706 | A1 | 3/2016 | Huang et al. |
| 2016/0179850 | A1 | 6/2016 | Martin et al. |
| 2019/0324798 | A1 | 10/2019 | Zou et al. |
| 2020/0364242 | A1 | 11/2020 | Martin et al. |
| 2021/0021471 | A1 * | 1/2021 | Jayaraman ......... H04L 41/0803 |

OTHER PUBLICATIONS

Notice of Allowance and Fee(S) Due for U.S. Appl. No. 14/972,514 (dated Mar. 5, 2020).
Applicant-Initiated Interview Summary for U.S. Appl. No. 14/972,514 (dated Jan. 27, 2020).
"Talari Networks Announces Availability of its Mercury T5000 WAN Appliance and New Supporting APNWare Software Upgrade," Talari Networks, Inc., pp. 1-5 (Nov. 13, 2012).
"Partial software upgrade using local change management," Citrix, pp. 1-4 (Oct. 15, 2019).
Non-Final Office Action for U.S. Appl. No. 14/972,514 (dated Sep. 13, 2019).
Advisory Action Before the Filing of an Appeal Brief and Applicant-Initiated Interview Summary for U.S. Appl. No. 14/972,514 (dated Feb. 28, 2019).
Final Office Action for U.S. Appl. No. 14/972,514 (dated Dec. 14, 2018).
Non-Final Office Action for U.S. Appl. No. 14/972,514 (dated Jun. 26, 2018).
Francis et al., "Schema Mappings for Data Graphs," https://project.inria.ft/bda2017/files/2017/11/talk6-2.pdf, 45 pages (2017).
Lagura, "My Network Lab," Basic Configuration of a Talari Networks T510 SD-WAN Appliance, http://wannabelab.blogspot.com/2016/11/basic-configuration-of-talari-networks.html, 11 pages (Nov. 18, 2016).
Hickford, "Using Migration Scripts in Database Deployments," https://www.red-gate.com/simple-talk/sql/database-administration/using-migration-scripts-in-database-deployments/, 20 pages (Jun. 17, 2014).
"SQL Compare 10 Part of the SQL Developer Bundle," redgate, https://web.archive.org/web/20130306083715/https:/www.red-gate.com/products/sql-development/sql-compare/, 2 pages (Mar. 6, 2013).
"Adaptive Private Networking Appliance Operation Guide: APNware Release 2.5," Talari Networks, 71 pages (2013).
Mills et al., "Network Time Protocol Version 4: Protocol and Algorithms Specification," RFC 5905, https://www.ietf.org/rfc/rfc5905.txt, 110 pages (Jun. 2010).
Morales, "Oracle® Database VLDB and Partitioning Guide," 11g Release 1 (11.1), Oracle, Chapters 1, 3, 84 pages (Jul. 2007).
DanielKabs, "How to Calibrate System Clock Using NTP," https://support.ntp.org/bin/view/Support/HowtoCalibrateSystemClockUsingNTP, 4 pages, (Mar. 6, 2006).
Case et al., "A Simple Network Management Protocal (SNMP)," RFC 1157, https://tools.ietf.org/html/rfc1157, 36 pages (May 1990).
Krasner et al., "A Description of the Model-View-Controller User Interface Paradigm in the Smalltalk-80 System," ParcPlace Systems, Inc., 34 pages (1988).
Notification of Transmittal of the International Search Report and the Written Opinion of the International Searching Authority, or the Declaration for International Application No. PCT/US2021/020112 (dated May 20, 2021).
Rosenberg et al., "An Offer/Answer Model with the Session Description Protocol (SDP)," RFC 3264, pp. 1-26 (Jun. 2002).

* cited by examiner

METHODS, SYSTEMS, AND COMPUTER READABLE MEDIA FOR MANAGING MULTIPLE SOFTWARE DEFINED WIDE AREA NETWORK (SD-WAN) SOFTWARE VERSIONS

PRIORITY CLAIM

This application claims the benefit of U.S. Provisional Patent Application Ser. No. 63/009,235, filed Apr. 13, 2020, the disclosure of which is incorporated herein by reference in its entirety.

TECHNICAL FIELD

The subject matter described herein relates to SD-WANs. More particularly, the subject matter described herein relates to managing multiple SD-WAN software versions.

BACKGROUND

In SD-WANs, network nodes, referred to as SD-WAN appliances, communicate with each other through tunnels, referred to herein as conduits, over wide area networks. In one exemplary network architecture, a central controller defines a single configuration of the SD-WAN and ensures that individual elements of the SD-WAN are configured appropriately to implement the overall configuration. The controller also manages software updates of the SD-WAN. Implementing SD-WAN features requires intelligent collaboration between SD-WAN network elements. Such intelligent collaboration requires that the SD-WAN network elements execute compatible SD-WAN software versions. SD-WAN software is the software executing on SD-WAN appliances to implement SD-WAN features.

In some SD-WAN network architectures, all SD-WAN appliances run the same version of SD-WAN software, and, when a new SD-WAN software version is available, the controller forces all of the SD-WAN appliances to update to the new release simultaneously. Having all SD-WAN appliances execute the same software version and update simultaneously to the new software version ensures compatibility between SD-WAN appliances. However, forcing all SD-WAN appliances to simultaneously update to the new version of SD-WAN software results in network unavailability during the update process. Because SD-WANs can span all time zones, there is no convenient time for a network-wide SD-WAN software update that will not result in daytime service outage for some users.

In some SD-WAN architectures, SD-WAN network elements in the same network are permitted to execute different software versions. However, the different versions are typically patch releases with small bug fixes and no substantial new features. Only allowing different software versions that are bug fixes without substantial new features ensures compatibility between the SD-WAN network elements implementing the different software versions but slows the rollout of new features. In such an architecture, updating the SD-WAN to a major release with new features still requires all SD-WAN network elements to update at the same time.

In the SD-WAN and computer networking industry, network protocol compatibility is often provided by defining an established feature set and using only that feature set. For example, Internet protocol version 4 (IPv4) has an established feature set, such as header field formats, that nodes must adhere to be able to communicate with each other. As long as all nodes agree on the feature set defined by IPv4, communication is possible. If it is desirable to change the size of a header field, such as the IPv4 address, the network nodes must upgrade to a new protocol, such as IP version 6 (IPv6), which is not compatible with IPv4.

It is desirable to allow different versions of SD-WAN software to simultaneously exist on different SD-WAN nodes, where the different SD-WAN versions include more that just bug fixes and that may include at least some features that are incompatible. Another problem associated with allowing different software versions to exist on SD-WAN appliances is that the configuration of the appliances, which is controlled by the controller, is tied to the software level being executed by the appliance. Requiring the controller to know how to create the configuration for each software level implemented by each network element is undesirable, especially when an SD-WAN appliance could run newer software than the controller. Again, configuring the SD-WAN appliances is simpler if every SD-WAN appliance runs the same software version, because the controller is only required to create configurations that are tied to a single software version. However, in a network where the SD-WAN appliances run different software versions, a mechanism for reducing controller complexity in creating configurations for the SD-WAN appliances is needed.

Accordingly, in light of these and other difficulties, there exists a need for improved methods, systems, and computer readable media for managing different SD-WAN software versions.

SUMMARY

The subject matter described herein provides a methodology for an SD-WAN controller to precisely control the software revision of each network element in the SD-WAN and guarantee compatibility between all elements of the SD-WAN. The SD-WAN controller is able to maintain a single configuration that describes the SD-WAN and knows which features of the SD-WAN are supported by which software versions. The SD-WAN controller is able to present configuration options to the user that are supported by all elements of the SD-WAN and can prevent the enabling of features that cannot be used when some network elements are running software versions that lack support for that feature.

The low-level configuration options of each network element (referred to herein as "registries") can vary depending on the software level, and, as described above, it is undesirable to force the SD-WAN controller to know how to create the registries for each network element, especially when the network element could run newer software than the controller. To avoid this difficulty, the subject matter described herein defines an intermediate configuration language registry, which is implemented in the examples described herein using the extensible markup language (XML), that defines the configuration of a specific network element without going into low-level details. The SD-WAN controller creates and distributes the intermediate configuration language configuration registries to the SD-WAN network elements. The SD-WAN network elements use the intermediate language configuration registries to configure SD-WAN network elements. The SD-WAN network elements implementing different software versions then negotiate with each other using a versioning protocol to implement compatible SD-WAN features, such as communication protocol message formats and shared memory parameters.

Using the subject matter described herein, the SD-WAN controller can generate a set of intermediate configuration language registries that can work for any software revision in the SD-WAN network. This allows the SD-WAN controller to offer options to upgrade the software of any element in the network with no restrictions, even when the software upgrade adds significant new features and makes changes to the network protocols and only a portion of the network elements can be upgraded.

When SD-WAN network elements form connections, referred to herein as conduits, to each other, the SD-WAN network elements use the versioning protocol to negotiate details of the conduit communication protocol to be used. By negotiating a set of compatible features using the versioning protocol, it is always guaranteed that newer software can run the conduit communications protocol in a mode that is compatible with older software version, and the SD-WAN controller guarantees that there will be no features configured that require a newer mode of the conduit communications protocol.

Unlike other industry solutions, this subject matter described herein works just as well when downgrading software. This is helpful if software needs to be rolled back in the case where a bug in the new software is encountered.

According to one aspect of the subject matter described herein, a method for managing multiple SD-WAN software versions is provided. The method includes providing a controller that defines an overall configuration for an SD-WAN and that creates configuration registries for individual SD-WAN appliances to implement their respective portions of the overall configuration. The method includes generating, at the controller and in an intermediate configuration language registry format, a first configuration registry for a first SD-WAN appliance that executes a first version of SD-WAN software. The method further includes generating, at the controller and in the intermediate configuration language registry format, a second configuration registry for a second SD-WAN appliance that executes a second version of the SD-WAN software different from the first version of the SD-WAN software. The method further includes transmitting the first configuration registry to the first SD-WAN appliance and transmitting the second configuration registry to the second SD-WAN appliance. The method further includes receiving the first configuration registry at the first SD-WAN appliance and using the first configuration registry to configure the first SD-WAN appliance. The method further includes receiving the second configuration registry at the second SD-WAN appliance and using the second configuration registry to configure the second SD-WAN appliance. The method further includes negotiating, between the first and second SD-WAN appliances, for common SD-WAN features usable to implement configurations specified in the first and second configuration registries.

According to another aspect of the subject matter described herein, generating the first and second configuration registries in an intermediate configuration language includes generating the first and second configuration registries in a format in which attribute names are assigned to SD-WAN configuration elements.

According to another aspect of the subject matter described herein, using the first and second configuration registries to configure the first and second SD-WAN appliances includes identifying names of the attributes in the first and second configuration registries corresponding to configuration elements used by the first and second SD-WAN appliances to provide SD-WAN service, reading values of the attributes, and storing the values in records in configuration databases maintained by the first and second SD-WAN appliances.

According to another aspect of the subject matter described herein, generating the first and second configuration registries includes receiving, as input, a highest intermediate configuration language registry version supported by the first and second SD-WAN appliances and generating the first and second configuration registries in the highest supported intermediate configuration language registry version.

According to another aspect of the subject matter described herein, negotiating between the first and second SD-WAN appliances includes negotiating using a versioning protocol implemented by the first and second SD-WAN appliances.

According to another aspect of the subject matter described herein, negotiating using the versioning protocol includes: transmitting a versioning protocol Check message from the first SD-WAN appliance to the second SD-WAN appliance, the versioning protocol Check message including a record indicating a highest version of a protocol supported by the first SD-WAN appliance; at the second SD-WAN appliance, receiving the versioning protocol Check message and determining whether the second SD-WAN appliance supports the version of the protocol identified in the record in the versioning protocol Check message; at the second SD-WAN appliance, in response to determining that the second SD-WAN appliance supports the version of the protocol identified in the record in the versioning protocol Check message, sending a versioning protocol OK message indicating support for the version of the protocol indicated in the versioning protocol Check message; and, at the second SD-WAN appliance, in response to determining that the second SD-WAN appliance does not support the version of the protocol identified in the record in the versioning protocol Check message, sending a versioning protocol NOkay message indicating a highest version of the protocol supported by the second SD-WAN appliance that is less that the version of the protocol identified in the record in the versioning protocol Check message.

According to another aspect of the subject matter described herein, the protocol negotiated using the versioning protocol comprises a protocol defining a format for conduit messages for carrying traffic between the first and second SD-WAN appliances through conduits between the first and second SD-WAN appliances.

According to another aspect of the subject matter described herein, the protocol negotiated using the versioning protocol comprises an encryption negotiation method for negotiating encryption parameters used to encrypt traffic transmitted through conduits between the first and second SD-WAN appliances.

According to another aspect of the subject matter described herein, the protocol negotiated using the versioning protocol comprises a protocol defining a format for control messages transmitted between the first and second SD-WAN appliances through conduits between the first and second SD-WAN appliances.

According to another aspect of the subject matter described herein, the control messages include shared memory management messages.

According to another aspect of the subject matter described herein, a system for managing multiple software defined wide area network (SD-WAN) software versions is provided. The system includes a controller for defining an overall configuration for an SD-WAN and creating configuration registries for individual SD-WAN appliances to implement their respective portions of the overall configuration, wherein the controller generates first and second configuration registries in an intermediate configuration language and transmits the first and second configuration registries. The system further includes a first SD-WAN appliance for executing a first version of SD-WAN software, receiving the first configuration registry, and using the first configuration registry to configure the first SD-WAN appliance. The system further includes a second SD-WAN appliance for executing a second version of the SD-WAN software different from the first version of the SD-WAN software, receiving the second configuration registry, and using the second configuration registry to configure the second SD-WAN appliance. The first and second SD-WAN appliances are configured to negotiate with each other for common SD-WAN features usable to implement configurations specified in the first and second configuration registries.

According to another aspect of the subject matter described herein, the first and second SD-WAN appliances are configured to identify names of the attributes in the first and second configuration registries corresponding to configuration elements used by the first and second SD-WAN appliances to provide SD-WAN service, read values of the attributes, and store the values in records in configuration databases maintained by the first and second SD-WAN appliances.

According to another aspect of the subject matter described herein, the controller is configured to receive, as input, a highest intermediate configuration language registry version supported by the first and second SD-WAN appliances and generate the first and second configuration registries in the highest supported intermediate configuration language registry version.

According to another aspect of the subject matter described herein, the first and second SD-WAN appliances are configured to negotiate with each other for compatible SD-WAN features using a versioning protocol implemented by the first and second SD-WAN appliances.

According to another aspect of the subject matter described herein, a non-transitory computer readable medium having stored thereon executable instructions that when executed by a processor of a computer control the computer to perform steps is provided. The steps include providing a controller that defines an overall configuration for an SD-WAN and that creates configuration registries for individual SD-WAN appliances to implement their respective portions of the overall configuration. The steps further include generating, at the controller and in an intermediate configuration language registry format, a first configuration registry for a first SD-WAN appliance that executes a first version of SD-WAN software. The steps further include generating, at the controller and in the intermediate configuration language registry format, a second configuration registry for a second SD-WAN appliance that executes a second version of the SD-WAN software different from the first version of the SD-WAN software. The steps further include transmitting the first configuration registry to the first SD-WAN appliance and transmitting the second configuration registry to the second SD-WAN appliance. The steps further include receiving the first configuration registry at the first SD-WAN appliance and using the first configuration registry to configure the first SD-WAN appliance. The steps further include receiving the second configuration registry at the second SD-WAN appliance and using the second configuration registry to configure the second SD-WAN appliance. The steps further include negotiating, between the first and second SD-WAN appliances, for common SD-WAN features usable to implement configurations specified in the first and second configuration registries.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

The subject matter described herein includes methods, systems, and computer readable media for managing SD-WAN network elements executing different versions of SD-WAN software. As described above, the SD-WAN controller generates intermediate configuration language registries and distributes the registries to SD-WAN network elements, at least some of which execute different versions of SD-WAN software. The network elements receive the intermediate configuration language registries and use the intermediate configuration language registries to configure the SD-WAN network elements. The SD-WAN network elements executing different software versions then negotiate with each other to identify compatible sets of SD-WAN features. Before describing details of the intermediate configuration language and its use in SD-WANs, an example SD-WAN architecture will be described.

Figure 1:
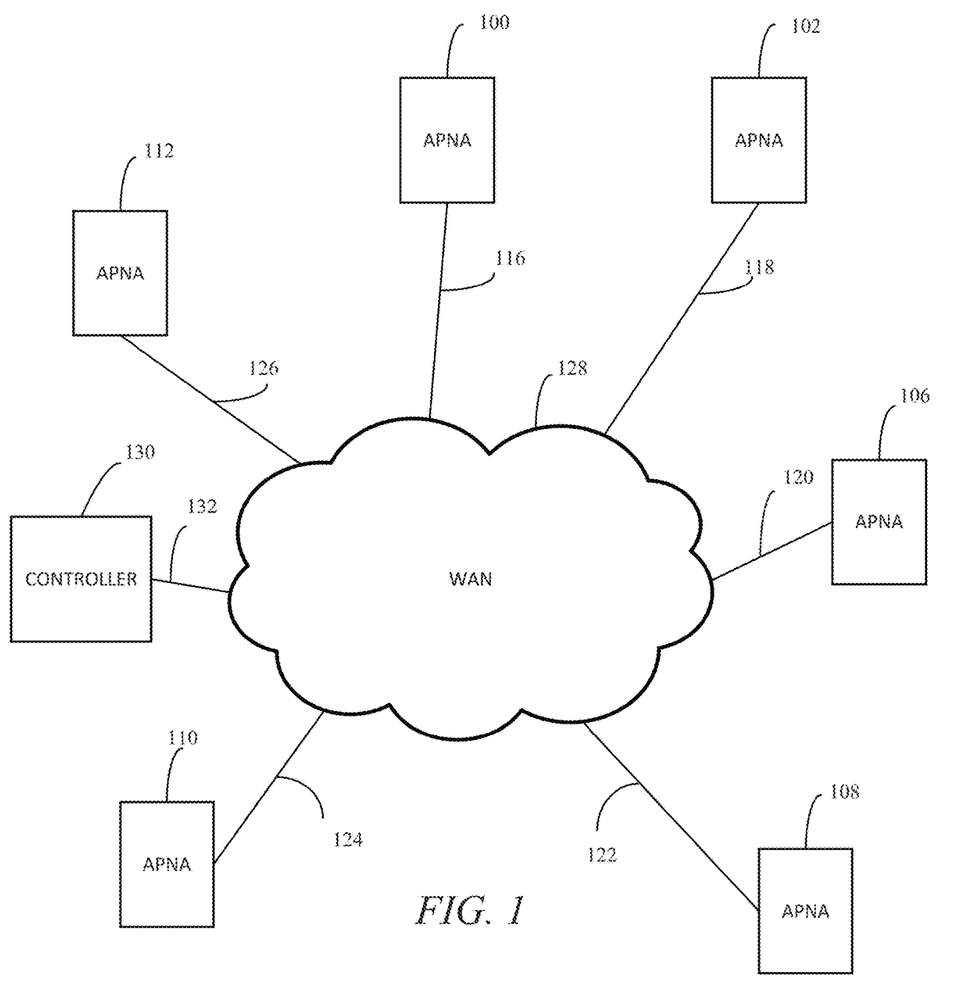
FIG. 1 is a network diagram illustrating an exemplary SD-WAN network architecture.

In the example architecture, the SD-WAN is referred to as an adaptive private network (APN). The SD-WAN network elements are referred to as APN appliances (APNAs), and the APNAs are connected to each other via tunnels, which are referred to as conduits. FIG. 1 illustrates an example of such an APN architecture. In FIG. 1, the architecture includes a plurality of APNAs 100, 102, 104, 106, 108, 110, and 112 are connected to each other via conduits 116, 118, 120, 122, 124, and 126. A conduit is a connection between APN appliances. Conduits can be used to carry traffic between APNAs across WAN 128. A controller 130 controls the overall configuration and operation of the APN by distributing configurations to APNAs 100, 102, 104, 106, 108, 110, and 112. If APNAs 100, 102, 104, 106, 108, 110, and 112 are executing different APN software versions, controller 130 must distribute configurations that do not cause incompatible features to be implemented by APNAs 100, 102, 104, 106, 108, 110, and 112. As described above, controller 130 handles such configuration by distributing intermediate configuration language registries to APNAs 100, 102, 104, 106, 108, 110, and 112 via one or more conduits 132. APNAs 100, 102, 104, 106, 108, 110, and 112 use the intermediate configuration language registries to configure APNAs 100, 102, 104, 106, 108, 110, and 112 to implement SD-WAN features. APNAs 100, 102, 104, 106, 108, 110, and 112 negotiate with each other to implement compatible APN features.

Figure 2:
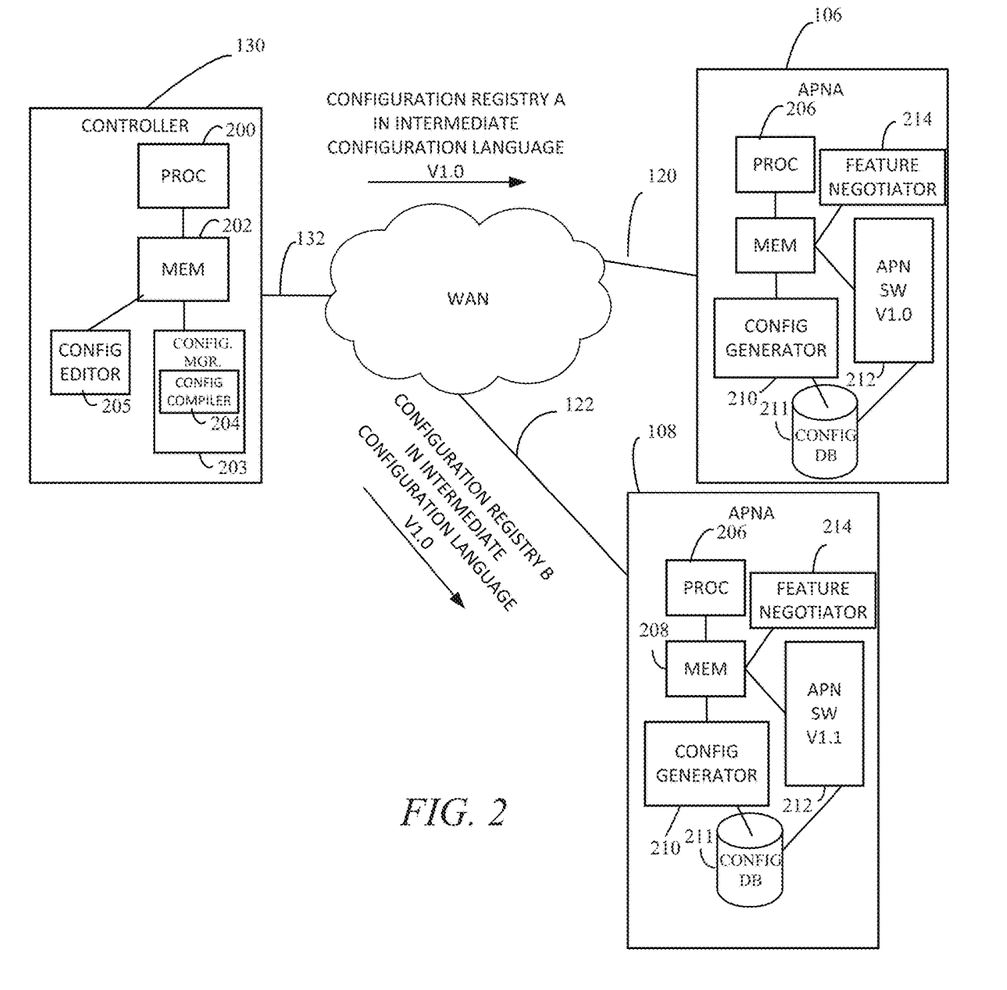
FIG. 2 is a network diagram illustrating distribution of configuration registries to SD-WAN network elements executing different software versions, where the configuration registries are in an intermediate configuration language format.

FIG. 2 is a diagram illustrating controller 130 generating and sending configuration registries to APNAs 106 and 108 executing different versions of APN software. In FIG. 2, controller 130 includes at least one processor 200 and memory 202. Controller 130 also includes a configuration manager 203 that generates and distributes configuration registries for configuring APNAs 106 and 108. The configuration registries are in the intermediate configuration language registry format, which will be described in more detail below. Configuration manager 203 includes a configuration compiler 204 that generates the configuration registries based on configuration options selected by the user via a configuration editor 205. Configuration editor 205 presents to the user options for configuring APN appliances based on the APN software versions being executed by the APN appliances to that only compatible configurations are generated and sent to the APN appliances. Configuration editor 205 will know the highest common registry version supported by the appliances in the network and apply that when running the compiler and presenting the editable configuration objects to the user.

In a prior implementation of controller 130, compiler 204 generated a set of registry files containing numbers representing configuration options and their values that are read by the APN software of each APN appliances and used to populate the configuration database. The following is an example of a part of a configuration file that a prior implementation of compiler 204 would receive as input:

add appliance name=controller
    {
      set appliance_properties
        model=vt800
        secure_key=0x9f3c2777661d5643
        appliance_mode=primary controller
      ;

The above-listed configuration example configures an appliances to function as a primary controller of a specific model and using a specific security key. The prior implementation of compiler 204 would convert the configuration example indicated above into the following comma separated value (CSV) configuration registries, which would be communicated to the appliances. The following is one of the CSV configuration files called main.reg:

13,0,0,0,0,0,3,0
14,0,0,0,0,0, 6,Controller-VT800
15,0,0,0,0,0,3,0
16,0,0,0,0,0,6,controller
20,0,0,0,0,0,6,vt800
21,0,0,0,0,0,7,0
23,0,0,0,0,0,3,0
721,0,0,0,0,0,3,3
722,0,0,0,0,0,3,0
722,1,0,0,0,0,3,1
722,2,0,0,0,0,3,2
723,0,0,0,0,0,3,1
723,1,0,0,0,0,3,0
723,2,0,0,0,0,3,2

The following is another CSV file generated for the configuration example above. This file is called sites.reg.

724,0,0,0,0,0, 6,Client-01-VT800
724,1,0,0,0,0, 6,Controller-VT800
724,2,0,0,0,0,6,simple-install
725,0,0,0,0,0,6,vt800
725,1,0,0,0,0,6,vt800
725,2,0,0,0,0,6,vt800
726,0,0,0,0,0,6,Appliance
726,1,0,0,0,0,6,controller
726,2,0,0,0,0,6,Appliance
727,0,0,0,0,0,7,0
727,1,0,0,0,0,7,0
727,2,0,0,0,0,7,0
728,0,0,0,0,0,6,
728,1,0,0,0,0,6,
728,2,0,0,0,0,6,
729,0,0,0,0,0,5, 35d549d499c7eca0
729,1,0,0,0,0,5, 9f3c2777661d5643
729,2,0,0,0,0,5, 19dcd6d922db29ba
731,0,0,0,0,0,7,0
731,1,0,0,0,0,7,0
731,2,0,0,0,0,7,0

To read these registries, the APN software running on each APN appliance must know what the first number of each line means. For example, 724 comes from the following #define statement in the APN software code.

define T2System_Config$Site_Table_Packed01$Name 724

The ID number, 724, is specific to the version of the APN software being executed by the APN appliances and compiler version. For example, if the ID number is generated using compiler version 7.3, it will not be readable by APN software version 8.0 because the value of the ID number for the configuration setting is not guaranteed to be the same across different APN software versions.

To enable compiler 204 to generate registries for different software versions, as indicated above, compiler 204 will receive as input, the highest registry version supported by all APN appliances in the network and will generate intermediate configuration language registries for the APN appliances in the highest supported intermediate configuration language registry format. Using the example in the preceding paragraph, if one APN appliance runs APN software version 7.3 and supports intermediate configuration language registry format 7.3 and another APN appliance executes APN software version 8.0 and supports intermediate configuration language registry formats 7.3 and 8.0, compiler 204 will receive as input intermediate configuration language registry version 7.3 and will generate intermediate configuration language registries according to intermediate configuration language registry format 7.3. In addition, rather than associating each configuration item with an ID number that may change between software releases, as will be described in detail below, in the intermediate configuration language registry format, configuration items are identified by names, and, for configuration items that are used across APN software releases, the names will remain the same. If a configuration item is added by a software release, the item will receive a new name. APN appliances executing different software versions may have different features and may negotiate with each other for a common set of supported APN features.

In FIG. 2, APNAs 106 and 108 each include at least one processor 206 and memory 208. APNAs 106 and 108 also include a configuration generator 210 for using the configuration registries received from controller 130 from the intermediate configuration language to configure APNAs 106 and 108. In one example, configuration generator 210 may generate a script which populates a configuration database 211 with configuration data read from the fields in the configuration registry. In the exemplary implementation described herein, the language used to create the configuration registries received from controller 130 is XML, and configuration generator 210 reads the names and the values of the XML attributes and uses the values to populate corresponding records in configuration database 211. Once the configuration data is populated in configuration database 211, APN software 212 reads the configuration in database 211 and creates the corresponding system configuration in memory 208. APN software 212 uses the system configuration in memory 208 to implement APN features, such as establishing and maintaining conduits, transmitting traffic over the conduits, and timing synchronization.

Each of APNAs 106 and 108 also includes a feature negotiator 214 for negotiating compatible features with other APNAs in the network. Feature negotiator 214 may utilize a versioning protocol to negotiate the compatible features. Exemplary uses of the versioning protocol will be described below.

As indicated above, the subject matter described herein enables APNAs to execute different versions of APN software. In the illustrated example, APNA 106 executes version 1.0 of APN software 212 and APNA 108 executes version 1.1 of APN software 212.

The intermediate configuration language does not require controller 130 to know underlying details of each APNA. The version of the intermediate configuration language used to create the registries will be the highest version supported by all APNAs in the network. In one example, the version number set for the registries is the same as the lowest APN software version supported by the network. In the illustrated example, APNA 106 uses APN software version 1.0, and APNA 108 uses APN software version 1.1. Because APN software version 1.0 is the lowest software version supported by the nodes in the network, the configuration registries will be created using version 1.0 of the intermediate configuration language.

The following is an example specification of the intermediate configuration language used to create the intermediate configuration registries:

```
<configuration registry_version="2.0.0.0.0"
config_editor_release="R9_0_0_0_0_GA_09010219"
compiler_release="R9_0_0_0_0_GA_09010219">
<table name="table1" registry="main" count=1>
<row>
<field name="field1" value="abcd" registry="main"/>
<field name="field2" value="0" registry="main"/>
<field name="field3" value="1234" registry="others"/>
</row>
</table>
<table name="table2" registry="route" count=2>
<row>
<field name="field1" value="abcd" registry="route"/>
<field name="field2" value="0" registry="route"/>
<field name="field3" value="1234" registry="route"/>
</row>
<row>
<field name="field1" value="abcd" registry="route"/>
<field name="field2" value="0" registry="route"/>
<field name="field3" value="1234" registry="route"/>
</row>
</table>
<registry>
<reg name="main" version="b543dcb88cc9c68ea7998735fe380740"/>
<reg name="interface" version="9fc98bf34b6c44e5bc07a917e6f6f186"/>
<reg name="route" version="ab13fc354b9d1ce28e8bdd307f17f60d"/>
<reg name="rules" version="a4c8de9689c9dd02f34aa6967c3d5f6a"/>
<reg name="class" version="c81d8cf22e1ccb110f50a45180a1a11c"/>
<reg name="sites" version="f01c19081d804949a98de85225b3a062"/>
<reg name="wanlinks" version="b4084a33e5095c7aeae92a8444a426a5"/>
<reg name="others" version="06207c5014b0b77e053ae486443170b4"/>
<reg name="defaults" version="d2d31bd9ea608f846c967e27b9dbdcd8"/>
<reg name="dynamic_route_filter" version="f45d3e57283c5c9bbaf2e238bab122e6"/>
<reg name="firewall" version="727cf33fd7287eaa2b73899c1d4d029f"
</registry></configuration>
```

Table 1 shown below illustrates the definitions of the fields in the example configuration registry above.

TABLE 1

Intermediate Configuration Language Registry Field Definitions

| Elements | Attributes | Description |
|---|---|---|
| configuration | | Element contains the entire configuration for a site. A collection of table elements |
| | registry_version | XML Registry Version |
| | config_editor_release | Release version of the configuration editor used to generate the configuration |
| | compiler_release | Release version of the APN compiler used to build the registry |
| Table | | Element contains the configuration data associated with that table A collection of row elements |
| | name | Name of the table |
| | registry | Registry the table definition belongs to |
| | count | Number of rows in the table Row count is important to the "main" registry. Some tables are defined as "main" but all of the fields belong to other registries. No field belongs to "main". Including the row count allows the md5hash calculation to detect changes for the main registry. |

TABLE 1-continued

Intermediate Configuration Language Registry Field Definitions

| Elements | Attributes | Description |
|---|---|---|
| Row | | Element contains the data associated with one entry in the table |
| | | A collection of field elements |
| Field | | Element contains the data associated with a specific field for a row in the table |
| | name | Name of the field |
| | value | The data stored in the field |
| | registry | Registry the field belongs to. The field can belong to a different registry as compared to the table registry. |
| Registry | | Element contains the registry version data |
| | | A collection of reg elements |
| Reg | | Element contains the version data for a specific registry |
| | name | Name of the registry |
| | version | Version or hash of the registry |

In the intermediate configuration language registry format defined above, SD-WAN configuration elements are assigned names, rather than ID numbers which change across software releases. For example, a configuration element for a WAN link be assigned a field name of WAN_Link, and a configuration element for a conduit may be assigned a field name of Conduit. The field names correspond to configuration elements that the APN software uses to configure the APN appliances to implement the corresponding features. The APN software executing on each device is only required to know how to read the attributes and the values in the intermediate configuration language registry format. There is no longer a requirement that the APN software be capable of reading registry files consisting of comma separated values with ID numbers that correspond to configuration elements.

As stated above, once each APN appliance receives its configuration registry from controller 130. An automatically generated script reads the configuration registry XML file, inserts the configuration into configuration database 211, and notifies APN software 130 the configuration data has been written to configuration database 211. Reading the configuration data from the XML file may include reading the values for the XML attributes specified above and writing the values of the attributes into corresponding records in configuration database 211.

For the APN software start up case, APN software 212 will wait until this notification is received to proceed to read from configuration database 211. For the configuration update case, the automatically generated script will also notify APN software 212 the type of registry change so that APN software 212 knows how to read those new changes from configuration database 211 database and the type of configuration update that needs to be performed. For a configuration update, because APN software 212 and the script populating values from the configuration registry are both writing to configuration database 211, the writes must be coordinated so that APN software 212 and the script do not corrupt each other's data.

As indicated above, when APN appliances receive their configurations from controller 130, the APN appliance negotiate with each other for compatible APN features using a versioning protocol. That protocol is referred to herein as TVP, which stands for Talari Versioning Protocol.

To support multiple SD-WAN or APN software versions, new TVP record types are added to negotiate different APN messages versions to use. If an unknown TVP record type is received, it will be ignored and the receiving APNA will use the default APN message's version. The current version of TVP uses type, length, value (TLV) for each record, making new records easy to and unknown records easy to ignore.

One type of message for which APN nodes may use TVP to negotiate compatible message formats is the messages used to establish and maintain conduits between APN appliances located at different sites. The conduits are tunnels that carry encrypted traffic between sites and may span multiple WAN links. Conduit traffic is encapsulated in an envelope with a header that includes a sequence number and a timestamp. This envelope allows packet loss, latency, and jitter to be measured so that traffic can be directed on the best path through the network and allows mitigation of network failures. The protocol that defines the message format for conduit messages is referred to as TRP, which stands for Talari Reliable Protocol.

A TRP version record can be used as an example of extensions to TVP needed to support multiple software versions. For the first multi-version release, of APN (SD-WAN) software, there will be no TRP version record needed. For future releases, if TRP header needs to be changed, a new record will be created. The following scenarios illustrate different use cases where TVP is used to negotiation TRP versions between different APN sites.

Figure 3:
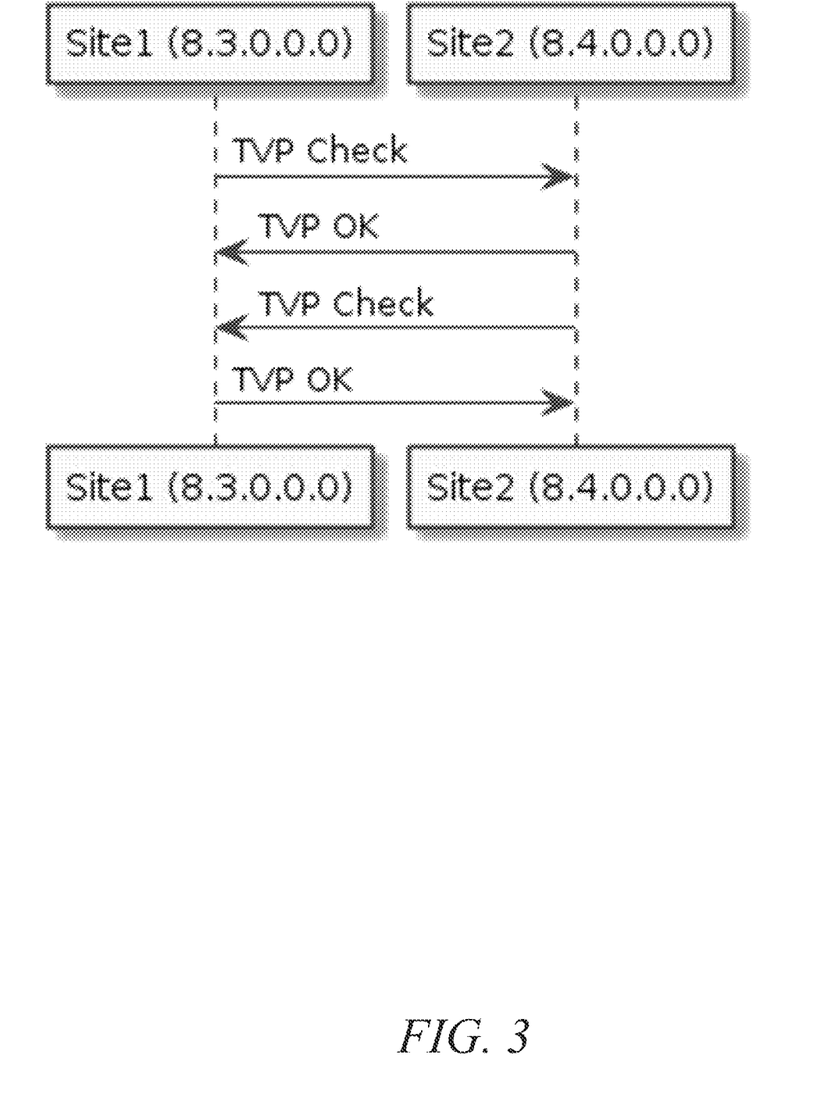
FIG. 3 is a message flow diagram illustrating feature negotiation between SD-WAN network elements where the SD-WAN implementing the lower version of the protocol being negotiated initiates a version check for the protocol.

Scenario 1 and FIG. 3 illustrate the use of TVP to negotiate TRP record formats when Site1, which only knows a single TRP version, initiates the TRP version check.

Scenario 1: Site1 runs APN software version 8.3.0.0.0 and has TRP version 8.3.0.0.0. Site2 runs APN software version 8.4.0.0.0 and supports TRP versions 8.3.0.0.0 and 8.4.0.0.0. In the first line of the message flow diagram in FIG. 2, Site1 sends a TVP check to Site2. The TVP check in line 1 does not include a TRP record because Site1 only knows a single TRP version. When Site2 receives the TVP check, it knows Site1 can only uses TRP 8.3.0.0.0, so Site2 uses TRP version 8.3.0.0.0 to communicate with Site1. The TVP OK in line 2 does not include TRP version record.

Figure 4:
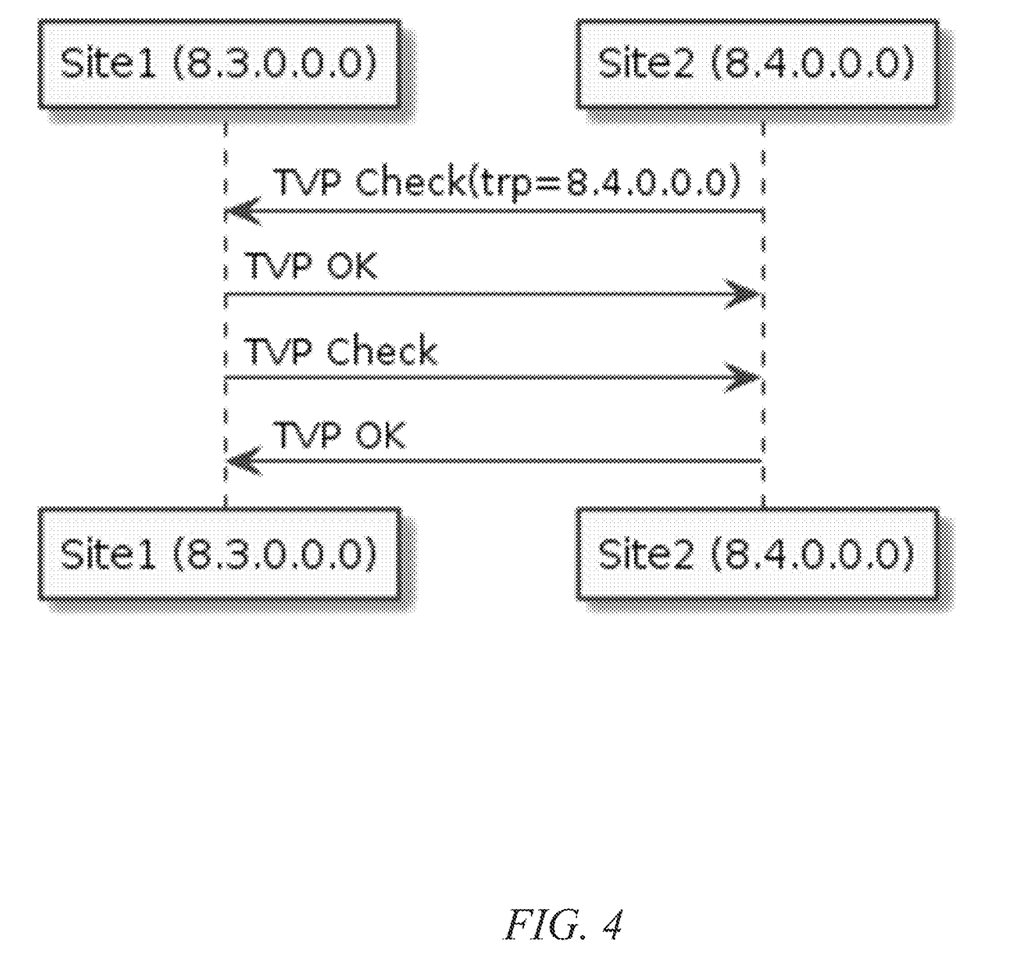
FIG. 4 is a message flow diagram illustrating feature negotiation between SD-WAN network elements where the SD-WAN network element supporting the higher version of the protocol being negotiated initiates the version check for the protocol.

Scenario 2 and FIG. 4 illustrate the use of TVP to negotiate TRP versions when Site2, which supports multiple TRP versions, initiates the TVP version check Scenario 2: In Scenario 2, Site 1 and Site2 have the same APN software versions and TRP versions as in Scenario1. However, in Scenario 2, Site2 sends the TVP check message to Site1 first. Because Site2 supports multiple TRP versions, if Site2 sends the TVP check first, Site2 will include its highest supported TRP version record, which is 8.4.0.0.0 in the TVP check message. When Site1 receives the TVP check message, Site2 will ignore the unknown TVP record. Accordingly, Site2 will send a TVP OK message to Site1 without a TRP version record. Upon receiving the TVP OK message without a TRP version record, Site2 will determine that it needs to use TRP version 8.3.0.0.0 to communicate with Site1.

Figure 5:
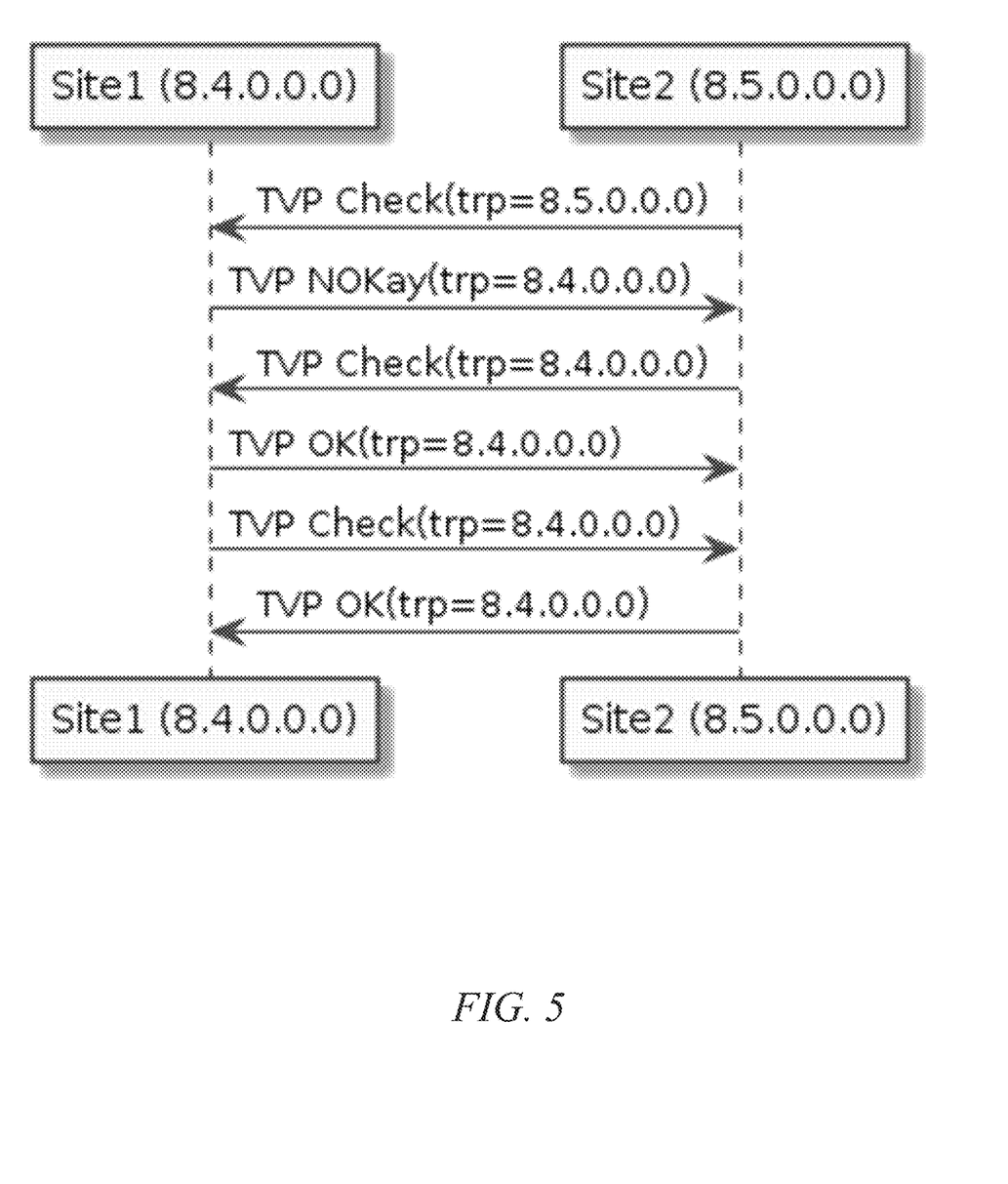
FIG. 5 is a message flow diagram illustrating feature negotiation between SD-WAN network elements where the SD-WAN network elements each support multiple versions of the protocol being negotiated.

Scenario 3 and FIG. 5 illustrate the use of TVP to negotiate TRP versions when one site supports two TRP versions and the other site supports three TRP versions.

Scenario 3: Site1 runs APN software version 8.4.0.0.0 and supports TRP versions 8.3.0.0.0 and 8.4.0.0.0. Site2 executes APN software version 8.5.0.0.0 and supports TRP versions 8.3.0.0.0, 8.4.0.0.0 and 8.5.0.0.0. In FIG. 5, Site2 sends the first TVP check message to Site1. The TVP check message includes a TRP version record 8.5.0.0.0. Site1 does not support TRP version 8.5.0.0.0, so Site1 replies with TVP NOKay message with TRP version 8.4.0.0.0 (the next highest TRP version supported by Site1). Site2 is able to support TRP version 8.4.0.0.0, so Site2 sends another TVP check message with TRP version 8.4.0.0.0 and receives TVP OK from Site1. After the message flow in FIG. 5, Site1 and Site2 can exchange tunnel management messages using TRP version 8.4.0.0.0.

Figure 6:
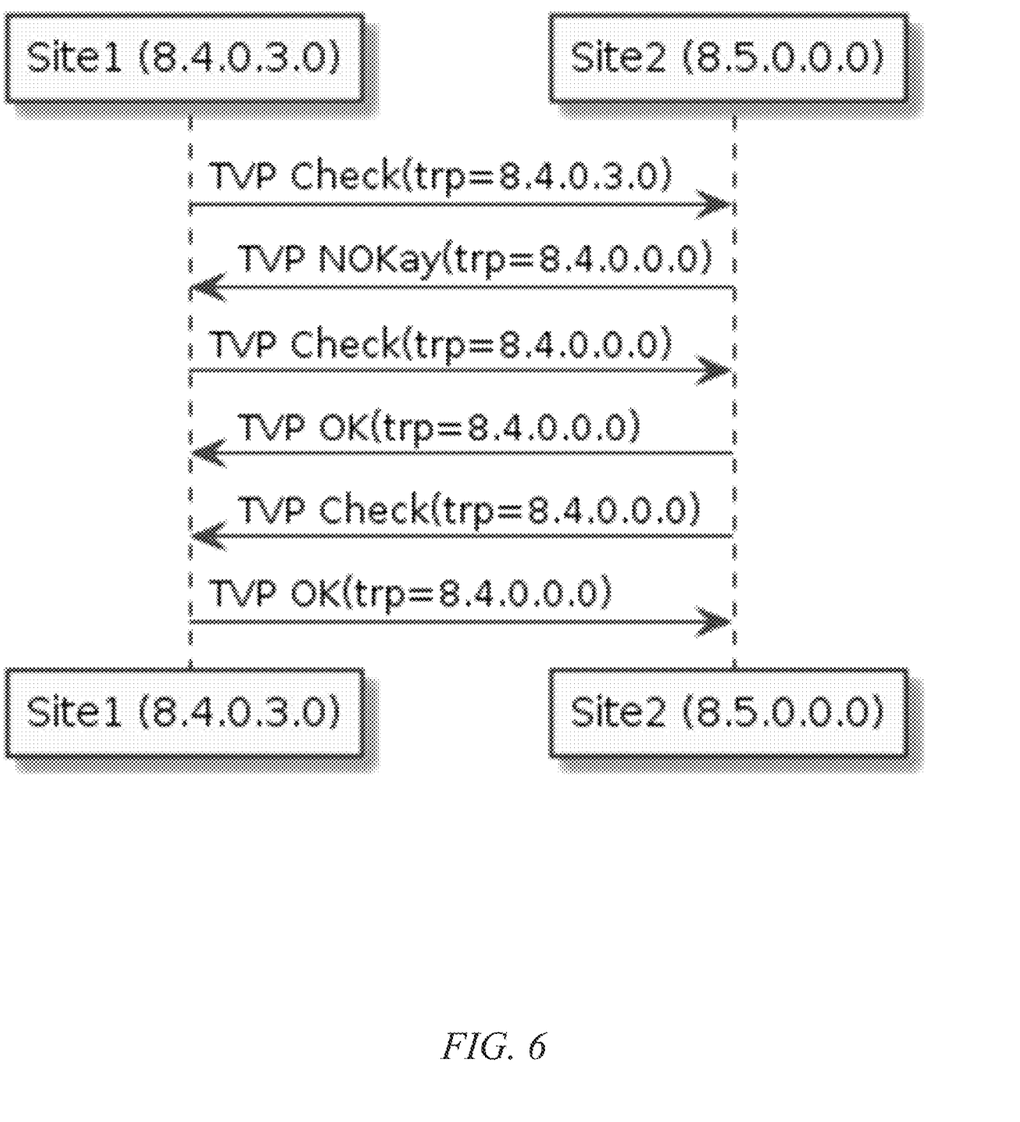
FIG. 6 is a message flow diagram illustrating feature negotiation between SD-WAN network elements where the SD-WAN network elements each support multiple versions of the protocol being negotiated where the SD-WAN element that initiates the version check using an intermediate version that is between two versions but unsupported by the other SD-WAN network element.

Scenario 4 and FIG. 6 illustrate the use of TVP to negotiate TRP versions when one site supports two TRP versions and the other site supports three TRP versions.

Scenario 4: Site1 runs APN software version 8.4.0.3.0 and supports TRP versions 8.3.0.0.0, 8.4.0.0.0, and 8.4.0.3.0. Site2 runs APN software 8.5.0.0.0 and supports TRP versions 8.3.0.0.0, 8.4.0.0.0 and 8.5.0.0.0. In the example illustrated in FIG. 6, Site1 first sends a TVP check message to Site2. The TVP check message includes a TRP version record of 8.4.0.3.0. Site2 does not support TRP version 8.4.3.0, so Site2 replies with a TVP NOKay with TRP version 8.4.0.0.0, which is the highest TRP version that Site2 supports which is lower than the TRP version received from Site1. Site1 is able to support TRP version 8.4.0.0.0, so Site1 sends another TVP check message with TRP version 8.4.0.0.0 and receives TVP OK from Site2. After the message flow illustrated in FIG. 6, Site1 and Site2 can use TRP version 8.4.0.0.0 to manage and communicate over tunnels between Site1 and Site2.

In FIGS. 3-6, TVP is used to negotiate the version of tunneling protocol messages between APN appliances located at different sites. In another example, TVP may be used to negotiate the tunnel encryption negotiation method used by APN appliances located a different sites. To use TVP to perform such negotiation, a new TVP record for encryption negotiation method is added to the TVP protocol. Prior to performing encryption negotiation, APN appliances located at different sites may utilize a default encryption negotiation method obtained from the configuration file received from the controller. Negotiation for the encryption negotiation method may be performed in the same manner as negotiating for the TRP version in FIGS. 3-6. That is, one site will send a TVP check message to another site with an encryption negotiation record specifying the highest version of the encryption negotiation method supported by the sending site. If the receiving site supports the encryption negotiation method, the receiving site will respond with a TVP OK message including an encryption negotiation record indicating support for the encryption negotiation method version supported by the sending site. If the receiving site does not support the encryption negotiation method, the receiving site responds with the highest encryption negotiation method version supported by the receiving site that is less than the encryption negotiation method received in the TVP check message from the sending site. Once the two sites agree on the encryption negotiation method, the encryption negotiation method can be used to negotiate tunnel encryption parameters between the two sites.

Once a conduit is established between two sites, the two sites exchange control messages over the tunnel. Examples of such control messages include heartbeat messages, nag messages, SACK/SNAK, messages, time synchronization messages, network restart messages, and shared memory management messages. Heartbeat messages are messages sent over a conduit to maintain determine the state of the conduit. Time synchronization messages are used to synchronize clocks of APN appliances with the central clock maintained by the controller. SACK or selective acknowledgment messages are used to acknowledge receipt of specific data. SNAK or selective negative acknowledgement message are used to signal data that has not been received. Nag messages can also be used to indicate data that has not been received. As with the TRP version and encryption negotiation method, the version for these types of control messages can be negotiated using the TVP protocol using the message flows illustrated in FIGS. 3-6, with the exception that the TVP protocol will carry a record that indicates the control message type and control message version supported by the sending site.

Using shared memory management messages as an example, APNs located in different sites may communicate with each other using shared memory. To communicate using shared memory, messages are exchanged using a protocol, which is referred to herein as the APN memory protocol or APN MEM. The APN MEM protocol has a version which defines the features and APN MEM If fields need to be changed to an APN MEM message, a new APN MEM type can be added. The TVP negotiation procedures illustrated in FIGS. 3-6 can be used to negotiate the APN MEM type to use between two ends of the conduit. APN MEM will use the pack/unpack function specific to the APN version to convert between shared memory information and the APN MEM message. The impacted APN MEM message will provide a callback function to unregister the old APN MEM type and register for new APN MEM type. If TVP negotiates a new APN MEM message type, this function will be called.

In addition to the above-described control protocol versions and message types, the following message types and corresponding protocol features can be negotiated using the message flows illustrated in FIGS. 3-6 with appropriate records added to the TVP protocol to identify the type of protocol being negotiated and the current version of the protocol supported by the APNA at each end of a conduit:

RACP—stands for redundant appliance configuration protocol—a high availability (HA) protocol used when two appliances service a site in a redundant configuration. The two appliances communicate status and negotiate which appliance should be active and represent the site.

TAP—stands for Talari Application Protocol. The TAP protocol is used to carry user data between sites through conduits.

Dynamic Conduit/Cloud Connect—These messages are used to trigger the creation of a conduit dynamically based on traffic flow.

Bandwidth testing—messages used to test conduit bandwidth

Path MTU—The path MTU is the maximum message transfer unit size that is supported over a path.

Traceroute—Traceroute is a path discovery protocol used to discover hops between a traffic source and a destination.

Header compression—Defines the header compression method used in conduit messages.

Dynamic route sharing—Dynamic route sharing messages allow APNAs to exchange routing information that is learned dynamically from the network, e.g., via open shortest path first (OSPF) or border gateway protocol (BGP).

Figure 7:
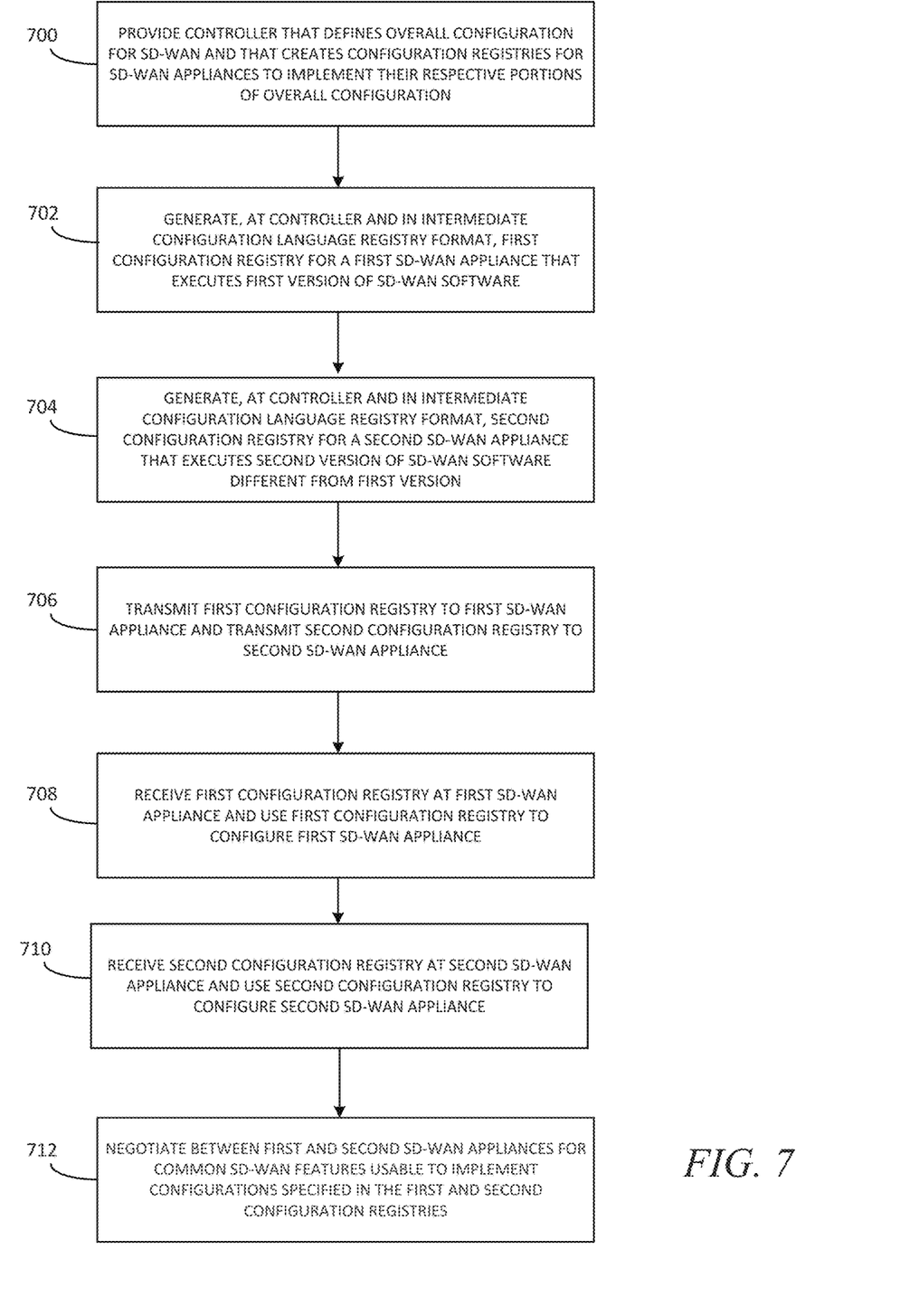
FIG. 7 is a flow chart illustrating exemplary steps for managing multiple SD-WAN software versions.

FIG. 7 is a flow chart illustrating an exemplary process for managing multiple software versions in an SD-WAN. Referring to FIG. 7, in step 700, the process includes providing a controller that defines an overall configuration for an SD-WAN and that creates configuration registries for individual SD-WAN appliances to implement their respective portions of the overall configuration. For example, controller 130 may present the user with valid APN configuration options given the software versions being executed by the APNAs in the network. Controller 130 may generate, from the configuration selected by the user, configuration registries for each APNA in the intermediated configuration language format.

In step 702, the process further includes generating, at the controller and in an intermediate configuration language registry format, a first configuration registry for a first SD-WAN appliance executing a first version of SD-WAN software. As described above, in one example, the intermediate configuration language is XML where configuration elements are assigned attribute names, which are given corresponding values. Attribute names are common across software releases so that the compiler that generates the intermediate configuration language configuration registries is not required to generate the registries in a format that is specific to the low-level details of each appliance. The compiler is provided as input and intermediate configuration language registry version that is the highest version supported by all APN appliances in the network and generates a intermediate configuration language registries in that version for each of the SD-WAN appliances being configured. It should be noted that the configurations provided to the different appliances will be different, for example, due to the different network connections of each appliance. However, each appliance will be able to read the intermediate configuration language registry that it receives from the controller.

In step 704, the process further includes generating, at the controller and in the intermediate configuration language registry format, a second configuration registry for a second SD-WAN appliance that executes a second version of the SD-WAN software different from the first version of the SD-WAN software. Even though the first and second SD-WAN appliances execute different software versions, they will each receive a configuration registry in the highest version of the intermediate configuration language that they both understand. Such a system assumes that higher versions of the APN software can read lower versions of the intermediate configuration language, which is facilitated by the fact that the intermediate configuration language uses names for configuration objects, rather than ID numbers that change across software releases.

In step 706, the process further includes transmitting the first configuration registry to the first SD-WAN appliance and transmitting the second configuration registry to the second SD-WAN appliance. For example, controller 130 may transmit the configuration registries to the SD-WAN appliances being configured.

In step 708, the process further includes receiving the first configuration registry at the first SD-WAN appliance and using the first configuration registry to configure the first SD-WAN appliance. In step 710, the process further includes receiving the second configuration registry at the second SD-WAN appliance and using the second configuration registry to configure the second SD-WAN appliance. Using the configuration registries to configure the first and second SD-WAN appliances may include identifying names of XML attributes in the first and second configuration registries corresponding to configuration elements used by the first and second SD-WAN appliances to provide SD-WAN service, reading values of the XML attributes, and storing the values in records in configuration databases 211. The SD-WAN software executing on the first and second SD-WAN appliances use the configurations stored in their respective configuration database 211 to write system configurations to memory 208. The SD-WAN software uses the system configuration to implement SD-WAN features, such as establishing and maintaining conduits, transmitting traffic over the conduits, performing timing synchronization, and negotiating SD-WAN features with other SD-WAN appliances.

In step 712, the process further includes negotiating, between the first and second SD-WAN appliances, for common features usable to implement configurations specified in the first and second configuration registries. For example, the SD-WAN appliances may negotiate SD-WAN features, such as conduit message formats, encryption negotiation method, control message protocol version, etc. The negotiation may occur using the versioning protocol and the exemplary messaging illustrated in FIGS. 3-6.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for managing multiple software defined wide area network (SD-WAN) software versions, the method comprising:

providing a controller that defines an overall configuration for an SD-WAN and that creates configuration registries for individual SD-WAN appliances to implement their respective portions of the overall configuration;

generating, at the controller and in an intermediate configuration language registry format, a first configuration registry for a first SD-WAN appliance that executes a first version of SD-WAN software;

generating, at the controller and in the intermediate configuration language registry format, a second configuration registry for a second SD-WAN appliance that executes a second version of the SD-WAN software different from the first version of the SD-WAN software;

transmitting the first configuration registry to the first SD-WAN appliance and transmitting the second configuration registry to the second SD-WAN appliance;

receiving the first configuration registry at the first SD-WAN appliance and using the first configuration registry to configure the first SD-WAN appliance;

receiving the second configuration registry at the second SD-WAN appliance and using the second configuration registry to configure the second SD-WAN appliance; and negotiating, between the first and second SD-WAN appliances, for common SD-WAN features usable to implement configurations specified in the first and second configuration registries.

2. The method of claim 1 wherein generating the first and second configuration registries in an intermediate configuration language includes generating the first and second configuration registries in a format in which attribute names are assigned to SD-WAN configuration elements.

3. The method of claim 2 wherein using the first and second configuration registries to configure the first and second SD-WAN appliances includes identifying names of the attributes in the first and second configuration registries corresponding to configuration elements used by the first and second SD-WAN appliances to provide SD-WAN service, reading values of the attributes, and storing the values in records in configuration databases maintained by the first and second SD-WAN appliances.

4. The method of claim 1 wherein generating the first and second configuration registries includes receiving, as input, a highest intermediate configuration language registry version supported by the first and second SD-WAN appliances and generating the first and second configuration registries in the highest supported intermediate configuration language registry version.

5. The method of claim 1 wherein negotiating between the first and second SD-WAN appliances includes negotiating using a versioning protocol implemented by the first and second SD-WAN appliances.

6. The method of claim 5 wherein negotiating using the versioning protocol includes:
   transmitting a versioning protocol Check message from the first SD-WAN appliance to the second SD-WAN appliance, the versioning protocol Check message including a record indicating a highest version of a protocol supported by the first SD-WAN appliance;
   at the second SD-WAN appliance, receiving the versioning protocol Check message and determining whether the second SD-WAN appliance supports the version of the protocol identified in the record in the versioning protocol Check message;
   at the second SD-WAN appliance, in response to determining that the second SD-WAN appliance supports the version of the protocol identified in the record in the versioning protocol Check message, sending a versioning protocol OK message indicating support for the version of the protocol indicated in the versioning protocol Check message; and
   at the second SD-WAN appliance, in response to determining that the second SD-WAN appliance does not support the version of the protocol identified in the record in the versioning protocol Check message, sending a versioning protocol NOkay message indicating a highest version of the protocol supported by the second SD-WAN appliance that is less that the version of the protocol identified in the record in the versioning protocol Check message.

7. The method of claim 6 wherein the protocol negotiated using the versioning protocol comprises a protocol defining a format for conduit messages for carrying traffic between the first and second SD-WAN appliances through conduits between the first and second SD-WAN appliances.

8. The method of claim 6 wherein the protocol negotiated using the versioning protocol comprises an encryption negotiation method for negotiating encryption parameters used to encrypt traffic transmitted through conduits between the first and second SD-WAN appliances.

9. The method of claim 6 wherein the protocol negotiated using the versioning protocol comprises a protocol defining a format for control messages transmitted between the first and second SD-WAN appliances through conduits between the first and second SD-WAN appliances.

10. The method of claim 9 wherein the control messages include shared memory management messages.

11. A system for managing multiple software defined wide area network (SD-WAN) software versions, the system comprising:
   a controller for defining an overall configuration for an SD-WAN and creating configuration registries for individual SD-WAN appliances to implement their respective portions of the overall configuration, wherein the controller generates first and second configuration registries in an intermediate configuration language and transmits the first and second configuration registries;
   a first SD-WAN appliance for executing a first version of SD-WAN software, receiving the first configuration registry, and using the first configuration registry to configure the first SD-WAN appliance;
   a second SD-WAN appliance for executing a second version of the SD-WAN software different from the first version of the SD-WAN software, receiving the second configuration registry, and using the second configuration registry to configure the second SD-WAN appliance;
   wherein the first and second SD-WAN appliances are configured to negotiate with each other for common SD-WAN features usable to implement configurations specified in the first and second configuration registries.

12. The system of claim 11 wherein the intermediate configuration language registry format includes attribute names that are assigned to SD-WAN configuration elements.

13. The system of claim 12 wherein the first and second SD-WAN appliances are configured to identify names of the attributes in the first and second configuration registries corresponding to configuration elements used by the first and second SD-WAN appliances to provide SD-WAN service, read values of the attributes, and store the values in records in configuration databases maintained by the first and second SD-WAN appliances.

14. The system of claim 11 wherein the controller is configured to receive, as input, a highest intermediate configuration language registry version supported by the first and second SD-WAN appliances and generate the first and second configuration registries in the highest supported intermediate configuration language registry version.

15. The system of claim 11 wherein the first and second SD-WAN appliances are configured to negotiate with each other for compatible SD-WAN features using a versioning protocol implemented by the first and second SD-WAN appliances.

16. The system of claim 15 wherein negotiating using the versioning protocol includes:
   transmitting a versioning protocol Check message from the first SD-WAN appliance to the second SD-WAN appliance, the versioning protocol Check message including a record indicating a highest version of a protocol supported by the first SD-WAN appliance;
   at the second SD-WAN appliance, receiving the versioning protocol check message and determining whether the second SD-WAN appliance supports the version of the protocol identified in the record in the versioning protocol Check message;
   at the second SD-WAN appliance, in response to determining that the second SD-WAN appliance supports the version of the protocol identified in the record in the versioning protocol Check message, sending a versioning protocol OK message indicating support for the version of the protocol indicated in the versioning protocol Check message; and
   at the second SD-WAN appliance, in response to determining that the second SD-WAN appliance does not support the version of the protocol identified in the record in the versioning protocol Check message, sending a versioning protocol NOkay message indicating a highest version of the protocol supported by the second SD-WAN appliance that is less that the version of the protocol identified in the record in the versioning protocol Check message.

17. The system of claim 16 wherein the protocol negotiated using the versioning protocol comprises a protocol defining a format for conduit messages for carrying traffic between the first and second SD-WAN appliances through conduits between the first and second SD-WAN appliances.

18. The system of claim 16 wherein the protocol negotiated using the versioning protocol comprises an encryption negotiation method for negotiating encryption parameters used to encrypt traffic transmitted through conduits between the first and second SD-WAN appliances.

19. The system of claim 16 wherein the protocol negotiated using the versioning protocol comprises a protocol defining a format for control messages transmitted between the first and second SD-WAN appliances through conduits between the first and second SD-WAN appliances.

20. A non-transitory computer readable medium having stored thereon executable instructions that when executed by a processor of a computer control the computer to perform steps comprising:

providing a controller that defines an overall configuration for an SD-WAN and that creates configuration registries for individual SD-WAN appliances to implement their respective portions of the overall configuration;

generating, at the controller and in an intermediate configuration language registry format, a first configuration registry for a first SD-WAN appliance that executes a first version of SD-WAN software;

generating, at the controller and in the intermediate configuration language, a second configuration registry for a second SD-WAN appliance that executes a second version of the SD-WAN software different from the first version of the SD-WAN software;

transmitting the first configuration registry to the first SD-WAN appliance and transmitting the second configuration registry to the second SD-WAN appliance;

receiving the first configuration registry at the first SD-WAN appliance and using the first configuration registry to configure the first SD-WAN appliance;

receiving the second configuration registry at the second SD-WAN appliance and using the second configuration registry to configure the second SD-WAN appliance; and     negotiating, between the first and second SD-WAN appliances, for common SD-WAN features usable to implement configurations specified in the first and second configuration registries.

\* \* \* \* \*

UNITED STATES PATENT AND TRADEMARK OFFICE
CERTIFICATE OF CORRECTION

PATENT NO.        : 11,178,005 B2
APPLICATION NO.   : 17/002762
DATED             : November 16, 2021
INVENTOR(S)       : Martin et al.

It is certified that error appears in the above-identified patent and that said Letters Patent is hereby corrected as shown below:

On the Title Page

On page 2, Column 2, under Other Publications, Line 23, delete "https ://" and insert -- https:// --, therefor.

On page 2, Column 2, under Other Publications, Line 35, delete "Protocal" and insert -- Protocol --, therefor.

In the Specification

In Column 2, Line 8, delete "that" and insert -- than --, therefor.

In Column 12, Line 45, delete "check" and insert -- check. --, therefor.

In Column 14, Line 31, delete "APN MEM message type, this function will be called." and insert the same on Column 14, Line 30 as a continuation of the same paragraph.

In Column 14, Lines 51-52, delete "bandwidth" and insert -- bandwidth. --, therefor.

In the Claims

In Column 17, Line 38, in Claim 6, delete "NOkay" and insert -- NOKay --, therefor.

In Column 17, Line 40, in Claim 6, delete "less that" and insert -- less than --, therefor.

In Column 18, Line 48, in Claim 16, delete "check message" and insert -- Check message --, therefor.

In Column 18, Line 63, in Claim 16, delete "NOkay" and insert -- NOKay --, therefor.

In Column 18, Line 65, in Claim 16, delete "less that" and insert -- less than --, therefor.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*